United States Patent Office 3,264,072
Patented August 2, 1966

3,264,072
PRODUCTION OF DICHLOROBORANE
Joseph Arthur Bergantz, Buffalo, N.Y., Norris James Brunsvold, Trenton, N.J., and Michael Robert Schmid, Rockville, Ind., assignors to FMC Corporation, a corporation of Delaware
No Drawing. Filed Oct. 7, 1960, Ser. No. 61,325
1 Claim. (Cl. 23—361)

This invention relates to an improvement in the process of producing dichloroborane ($BHCl_2$), and more specifically to the prevention of corrosion in process equipment used in the production of dichloroborane.

Dichloroborane is produced by reacting hydrogen gas with boron trichloride, $BCl_3$, in a reactor at temperatures between 900° F. (482° C.) and 1550° F. (843° C.), and at pressures of from one to thirty atmospheres. During this reaction, unreacted hydrogen and boron trichloride gas, as well as hydrogen chloride gas and chlorine, are given off. The chlorine is evolved from the breakdown of phosgene which is generally present as an impurity in the boron trichloride. The hydrogen chloride gas is evolved as a natural by-product in the production of dichloroborane.

The presence of these reactants and residual impurities at high temperatures is most serious since they are highly corrosive toward the metallic reactors and process equipment in which dichloroborane production is carried out. The characteristic high temperature corrosion by chlorine and hydrogen chloride has been reviewed in Industrial and Engineering Chemistry, July 1947, vol. 39, pages 839–844, by Brown et al. In this publication, on page 840, col. 2, line 1 et seq., it is reported that:

"In most cases the corrosion rate of metals and alloys in hydrogen chloride and chlorine tends to increase relatively slowly as the temperature is increased, up to a critical point varying with the individual material. Above this point further increase in temperature rapidly accelerates attack."

This point of accelerated decomposition is more clearly defined in the last paragraph of col. 2, at page 840.

"The behavior of individual materials indicates that, in general, the degree of corrosion is roughly proportional to the vapor pressure of the particular chlorides involved. In some cases, an example of which is shown in FIGURE 2, this relation appears to be quantitative over the temperature ranges investigated."

This article contains a table, on page 842 (which summarized the authors' findings and gives suggested values (for upper temperature limits) as a rough guide of the maximum temperatures at which given materials can be used without serious attack in an atmosphere of hydrogen chloride or chlorine. This table lists nickel as being suitable at temperatures of about 950° to 1000° F., in atmospheres of chlorine or hydrogen chloride. In contrast silver is considered so poor a metal in the presence of chlorine that it cannot be recommended even at temperatures as low as 250° F. Similarly, if the corrosive atmosphere constitutes hydrogen chloride, the maximum temperature of operation for silver is listed at 450° F.

It is an object of this invention to prevent corrosion of process equipment by the reactants and by-products present in the production of dichloroborane.

This and other objects will be apparent from the following description of the present invention.

It has now been determined, quite unexpectedly, that corrosion of process equipment used in producing dichloroborane by reacting hydrogen gas and boron trichloride at temperatures of about 900° to 1550° F. can be eliminated, by providing metallic silver surfaces on the process equipment in contact with the corrosive components of the reaction mixture. The silver may be applied to the equipment in the form of silver liners, by electroplating, casting, or by fabrication of the equipment from solid silver.

The determination that silver resists corrosion under these conditions is completely unexpected in view of the results obtained by prior workers. While the precise reason for this corrosion resistance is not known, it is believed that hydrogen gas present in the mixture may act to prevent the chlorine and hydrogen chloride from directly attacking the hot metal reactor; that is, the presence of hydrogen gas appears to reduce the thermodynamic tendency of silver to form chlorides. This is probably due to the inherent reducing action of hydrogen upon chlorides, rather than to any physical barrier of hydrogen gas on the surface of the metal. However, regardless of the reason, silver surfaces of the process equipment show no evidence of attack by the reactants or products of the reaction mixture. Metallic surfaces such as nickel and stainless steel, type 347, which are well known for their high resistance to corrosive materials such as chlorine and hydrogen chloride at high temperatures, in contrast are attacked by the reaction products.

In the present process the two reactants, $H_2$ and $BCl_3$, are preheated to increase their temperatures and to vaporize the $BCl_3$ prior to being mixed in the reactor. The two preheated feeds then are reacted in a reaction chamber maintained at from 900° to 1550° F., with temperature of about 1300° F. being preferred. Hydrogenation can be effected in the presence of a catalyst, if preferred. The pressure in the reactor is maintained at from 1 to 30 atmospheres, although atmospheric or subatmospheric pressures may be employed.

The resulting gaseous products are then sent to a scrubbing unit wherein hydrogen and hydrogen chloride are removed as an overhead fraction and separated from an extract phase containing boron trichloride and dichloroborane. The extract phase is fed into a disproportionater for recovery of the $BCl_3$ and to convert the $BHCl_2$ to $B_2H_6$. The recovered $BCl_3$ is recycled to the reactor for further production of dichloroborane.

The corrosive attack of the reactants on equipment employed in the instant process is extremely objectionable. In addition to the necessity for replacing the corroded equipment, the products of corrosion are deposited on downstream equipment such as catalytic reactors, catalyst beds and any cool surface downstream. These deposits adhere to the catalyst surface reducing its activity, and in the case of packed catalyst sections cause pressure drops which necessitate a shutdown of the operation for cleaning. These corrosion products very often act as catalysts for undesirable side reactions, particularly when the deposition takes place in the catalytic reactor.

In no-catalytic systems, cool surfaces of heat exchangers and other downstream equipment, coated with these products of corrosion, prevent efficient heat transfer and result in serious heat losses, again requiring periodic clean-outs. The only alternative to periodic cleanouts would be the maintenance of elaborate filtration equipment at each succeeding stage of the process. This is not economically desirable, because of the costly equipment involved and because of the maintenance required to operate such equipment.

The employment of process equipment, e.g. reactors, heat exchangers, or pipe conduits, having silver coatings or linings, eliminates any serious corrosion problem incurred in operating the instant process and overcomes the aforementioned difficulties. As a result shutdowns are not required to replace corroded equipment.

The following examples are given as illustrative of the invention and are not to be deemed as limitative of it. They are designed to show the unexpected resistance of silver to corrosion by the constituents of the instant process.

EXAMPLE 1

The runs reported in Table I hereinafter were carried out in a reactor having separate tubes for admitting the individual reactants, $BCl_3$ and $H_2$. The tube carrying the $BCl_3$ was preheated to temperatures specified in Table I. The tube carrying the hydrogen was not preheated. The feed materials were continuously flowed through the feed tubes and into the reactor for a period of from 15 to 30 minutes at the flow rates listed in Table I. The temperature of reaction is given in Table I. Catalysts employed in carrying out some of the runs are noted in Table I. $BHCl_2$ forms immediately and is withdrawn from the reactor, along with by-products, at a rate equal to the incoming feed. The materials employed in constructing the reactor and inlet tubes, and the degree of corrosion thereof are reported in Table I.

EXAMPLE 2

The runs reported in Table II hereinafter were carried out in a reactor having a common entry port for admitting $BCl_3$ and $H_2$. The $H_2$ and $BCl_3$ were mixed at room temperature and passed through a common feed pipe to preheat the mixture. The temperature of the preheated mixture is specified in Table II. The feed materials were continuously flowed through the feed pipe and into the reactor for a period of from 15 to 30 minutes at the flow rates listed in Table II. The temperature of reaction is given in Table II. The type of catalysts employed during hydrogenation is specified in Table II. $BHCl_2$ forms immediately and is withdrawn from the reactor, along with by-products, at a rate equal to the incoming feed. The materials employed in constructing the reactor and inlet tube, and the degree of corrosion thereof are reported in Table II.

EXAMPLE 3

The runs reported in Table III hereinafter were carried out in a reactor having a common entry port for admitting $BCl_3$ and $H_2$. The $H_2$ was preheated and mixed with unheated $BCl_3$ in a mixing T located just inside the preheat furnace. The temperature of the preheated mixture is specified in Table III. The feed mixture was continuously flowed from the mixing T into a common feed pipe, and into the reactor for a period of from 15 to 30 minutes at the flow rates listed in Table III. The last run was continued for 73 operating hours to determine if prolonged contact effected the silver-lined equipment. The temperature of reaction and the type of catalysts employed during hydrogenation are specified in Table III. $BHCl_2$ forms immediately and is withdrawn from the reactor, along with by-products, at a rate equal to the incoming feed. The materials employed in constructing the reactor, mixing T, and feed tube, and the degree of corrosion thereof are reported in Table III.

*Table I*

| Run | Preheater, Temp. of Preheater | Rate of Flow [1] | | Reactor, Catalyst, Temp. of Reactors | Results |
|---|---|---|---|---|---|
| | | $H_2$ | $BCl_3$ | | |
| 1 | ⅛″ O.D. Stainless Steel Tube, at 1,000° F. | 0.12 | 0.011 | Carbon steel reactor, no catalyst, Temp. 1,300° F. | $BCl_3$ preheater plugged up. Plug contained much $FeCl_3$. Reactor had a great deal of scale on inside surface. |
| 2 | ¼″ O.D. Stainless Steel Tube, at 1,450° F. | 0.12 | 0.012 | Type 347 Stainless Steel reactor, no catalyst, Temp. 1,300° F. | $BCl_3$ preheater burned out. Deposits in reactor contained Fe and $FeCl_2$. |
| 3 | ¼″ O.D. Stainless Steel Tube, at 600° F. | 0.09 | 0.012 | Same reactor as Run 2, no catalyst, Temp. 1,100° F. | Red deposits of $FeCl_2$ and $FeCl_3$ found in downstream equipment. Reactor had dark deposits on inside surface. |
| 4 | $BCl_3$ carried in ¼″ Stainless Steel tubing to 600° F., then carried in ⅛″ IPS nickel pipe to 1,060° F. | 0.10 | 0.006 | Nickel reactor, Ag screen catalyst, Temp. 1,150° F. | Yellow deposit formed on reactor; initial screen attacked and corroded. |

[1] Lb. Mols/Hr.

*Table II*

| Run | Preheater, Temp. of Preheater | Rate of Flow [1] | | Reactor, Catalyst, Temp. of Reactors | Results |
|---|---|---|---|---|---|
| | | $H_2$ | $BCl_3$ | | |
| 1 | ¼″ O.D. Stainless Steel Tube, at 500° F. | 0.10 | 0.006 | Type 347 Stainless Steel reactor: silver screen catalyst employed; temperature at 1,100° F. | Reactor attacked. |
| 2 | ¼″ O.D. IPS nickel pipe, at 800° F. | 0.10 | 0.008 | Type A nickel reactor: silver screen catalyst employed; temperature at 1,150° F. | Dirty green deposits at reactor entry and on reactor walls. |
| 3 | Silver-plated nickel pipe, at 700° F. | 0.10 | 0.008 | Silver-plated (0.001″) nickel reactor; silver screen catalyst employed; temperature at 1,050° F. | No deposits or attack. |

[1] Lb. Mols/Hr.

*Table III*

| Run | Preheater, Temp. of Preheater | Rate of Flow [1] | | Reactor, Catalyst, Temp. of Reactors | Results |
|---|---|---|---|---|---|
| | | $H_2$ | $BCl_3$ | | |
| 1 | Silver-plated T and pipe, at 1,050° F. | 0.10 | 0.008 | Silver-plated (0.001″) nickel reactor; silver screen catalyst employed; temperature at 1,170° F. | Almost spotless. |
| 2 | Silver-plated T and pipe, at 1,330° F. | 0.10 | 0.005 | Silver-plated nickel reactor; alternate 1″ layers of silver, No. 316 stainless steel, silver, nickel, silver, monel, and silver screens employed; temperature at 1,300° F. | The stainless steel screens lost weight depositing black material on silver screens next following; nickel became weak and brittle, gained weight and had no effect on silver screens. Monel became weaker, gained weight, and had no effect on silver screens; silver remained bright and shining. |
| 3 | Silver-lined mixing T and tube, at 1,300° F. | 0.07 | 0.023 | Silver-lined stainless steel reactor; silver screen catalyst employed; temperature at 1,300° F. | Inspection after 73 operating hours showed only slight discoloration on inlet screens; silver liners were unattacked. |

[1] Lb. Mols/Hr.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art, and having the benefit of this disclosure, otherwise than as specifically described and exemplified herein.

What is claimed is:

In the process of producing dichloroborane wherein hydrogen and vaporized boron trichloride are passed through a conduit zone to a reaction zone maintained at temperatures between about 900° to 1550° F., and wherein said boron trichloride is hydrogenated to form said dichloroborane, the improvement which comprises employing metallic silver surfaces in all of said zones whose interior walls contact said initial reactants and their reaction products at temperatures from about 500° to 1550° F. thereby preventing excessive corrosion of said conduit zones and said reaction zones.

References Cited by the Examiner

UNITED STATES PATENTS 2,875,028  2/1959  Winternitz _____ 23—204 X
3,216,797  11/1965 Murib et al. _____ 23—204

OSCAR R. VERTIZ, Primary Examiner.

ROGER L. CAMPBELL, CARL D. QUARFORTH, Examiners.

R. D. MORRIS, J. D. VOIGHT, M. WEISSMAN, Assistant Examiners.